(12) United States Patent
Smith et al.

(10) Patent No.: US 7,553,438 B2
(45) Date of Patent: Jun. 30, 2009

(54) COMPRESSION OF RESIN IMPREGNATED INSULATING TAPES

(75) Inventors: James D Smith, Monroeville, PA (US); Gary Stevens, Surrey (GB); John W Wood, Winter Springs, FL (US); Andreas Lutz, Buesserach (CH)

(73) Assignee: Siemens Energy, Inc., Orlando, FL (US)

( * ) Notice: Subject to any disclaimer, the term of this patent is extended or adjusted under 35 U.S.C. 154(b) by 813 days.

(21) Appl. No.: 11/106,845

(22) Filed: Apr. 15, 2005

(65) Prior Publication Data

US 2005/0274450 A1    Dec. 15, 2005

Related U.S. Application Data

(60) Provisional application No. 60/580,023, filed on Jun. 15, 2004.

(51) Int. Cl.
*B29C 43/20* (2006.01)
*B29C 43/58* (2006.01)
*B29C 45/14* (2006.01)
*H02K 15/12* (2006.01)

(52) U.S. Cl. .............. 264/257; 264/272.19; 264/272.2; 156/53

(58) Field of Classification Search ............ 264/272.19, 264/272.2; 156/53
See application file for complete search history.

(56) References Cited

U.S. PATENT DOCUMENTS

| | | | |
|---|---|---|---|
| 3,246,271 A | 4/1966 | Ford | |
| 3,866,316 A | 2/1975 | Takechi et al. | |
| 3,974,302 A | 8/1976 | Croop et al. | |
| 4,001,616 A | 1/1977 | Lonseth et al. | |
| 4,160,926 A | 7/1979 | Cope et al. | |
| 4,335,367 A | 6/1982 | Mitsui et al. | |
| 4,361,661 A | 11/1982 | Jackson | |
| 4,400,226 A | 8/1983 | Horrigan | |
| 4,427,740 A | 1/1984 | Stackhouse et al. | |
| 4,634,911 A | 1/1987 | Studniarz et al. | |
| 4,694,064 A | 9/1987 | Tomalia et al. | |
| 4,704,322 A | 11/1987 | Roberts | |
| 4,760,296 A | 7/1988 | Johnston et al. | |
| 4,806,806 A | 2/1989 | Hjortsberg et al. | |
| 5,011,872 A | 4/1991 | Latham et al. | |
| 5,037,876 A | 8/1991 | Birkle et al. | |

(Continued)

FOREIGN PATENT DOCUMENTS

EP    0 157 936 A1    10/1985

(Continued)

OTHER PUBLICATIONS

"Mica Tapes" Samicapor® HTC 381.58, VonRoll-Isola, The Swiss Insulating Works Ltd., 1 page.

(Continued)

*Primary Examiner*—Robert Dye

(57) ABSTRACT

The present invention provides for a method of impregnating a matrix with a high thermal conductivity filled resin 32, which produces a resin impregnated matrix. The high thermal conductivity material 30 comprises 5-60% by volume of the resin 32. This is compressed by approximately 5-30%, and the distances between the high thermal conductivity materials loaded in the resin are reduced, and the resin is then cured.

20 Claims, 2 Drawing Sheets

U.S. PATENT DOCUMENTS

| | | |
|---|---|---|
| 5,126,192 A | 6/1992 | Chellis et al. |
| 5,281,388 A * | 1/1994 | Palmer et al. ............... 264/571 |
| 5,466,431 A | 11/1995 | Dorfman et al. |
| 5,510,174 A | 4/1996 | Litman |
| 5,540,969 A | 7/1996 | Schuler |
| 5,578,901 A | 11/1996 | Blanchet-Fincher et al. |
| 5,723,920 A | 3/1998 | Markovitz et al. |
| 5,780,119 A | 7/1998 | Dearnaley et al. |
| 5,801,334 A | 9/1998 | Theodorides |
| 5,878,620 A | 3/1999 | Gilbert et al. |
| 5,904,984 A | 5/1999 | Smith et al. |
| 5,938,934 A | 8/1999 | Balogh et al. |
| 5,982,056 A | 11/1999 | Koyama et al. |
| 6,015,597 A | 1/2000 | David |
| 6,048,919 A | 4/2000 | McCullough |
| 6,103,382 A | 8/2000 | Smith et al. |
| 6,130,495 A | 10/2000 | Schulten et al. |
| 6,130,496 A | 10/2000 | Takigawa et al. |
| 6,140,590 A | 10/2000 | Baumann et al. |
| 6,160,042 A | 12/2000 | Ishida |
| 6,190,775 B1 | 2/2001 | Smith et al. |
| 6,238,790 B1 | 5/2001 | Smith et al. |
| 6,255,738 B1 | 7/2001 | Distefano et al. |
| 6,261,424 B1 | 7/2001 | Goncharenko et al. |
| 6,261,481 B1 | 7/2001 | Akatsuka et al. |
| 6,265,068 B1 | 7/2001 | David et al. |
| 6,288,341 B1 | 9/2001 | Tsunoda et al. |
| 6,344,271 B1 | 2/2002 | Yadav et al. |
| 6,359,232 B1 | 3/2002 | Markovitz et al. |
| 6,393,642 B1 | 5/2002 | Pollman et al. |
| 6,396,864 B1 | 5/2002 | O'Brien et al. |
| 6,432,537 B1 | 8/2002 | Devlin et al. |
| 6,504,102 B2 | 1/2003 | Tsunoda et al. |
| 6,506,331 B2 | 1/2003 | Meguriya |
| 6,509,063 B1 | 1/2003 | McCarthy et al. |
| 6,548,172 B2 | 4/2003 | David et al. |
| 6,572,937 B2 | 6/2003 | Hakovirta et al. |
| 6,632,561 B1 | 10/2003 | Bauer et al. |
| 6,635,720 B1 | 10/2003 | Tomalia et al. |
| 6,746,758 B2 | 6/2004 | Tsunoda et al. |
| 6,821,672 B2 | 11/2004 | Zguris |
| 6,882,094 B2 | 4/2005 | Dimitrijevic et al. |
| 6,905,655 B2 | 6/2005 | Gabriel et al. |
| 6,974,627 B2 | 12/2005 | Morita et al. |
| 7,033,670 B2 | 4/2006 | Smith |
| 7,042,346 B2 | 5/2006 | Paulsen |
| 7,120,993 B2 | 10/2006 | Yamamoto et al. |
| 7,180,409 B2 | 2/2007 | Brey |
| 7,189,778 B2 | 3/2007 | Tobita et al. |
| 7,425,366 B2 | 9/2008 | Okamoto et al. |
| 2002/0058140 A1 | 5/2002 | Dana et al. |
| 2002/0070621 A1 | 6/2002 | Mori et al. |
| 2002/0098285 A1 | 7/2002 | Hakovirta et al. |
| 2003/0035960 A1 | 2/2003 | Tsunoda et al. |
| 2003/0040563 A1 | 2/2003 | Sagal et al. |
| 2004/0094325 A1 | 5/2004 | Yoshida et al. |
| 2004/0152829 A1 | 8/2004 | Tobita et al. |
| 2004/0241439 A1 | 12/2004 | Morita et al. |
| 2005/0097726 A1 | 5/2005 | Yamamoto et al. |
| 2005/0116336 A1 | 6/2005 | Chopra et al. |
| 2005/0161210 A1 | 7/2005 | Zhong et al. |
| 2005/0208301 A1 | 9/2005 | Okamoto et al. |
| 2005/0236606 A1 | 10/2005 | Toas et al. |
| 2005/0245644 A1 | 11/2005 | Smith et al. |
| 2005/0274450 A1 | 12/2005 | Smith et al. |
| 2005/0274540 A1 | 12/2005 | Smith et al. |
| 2005/0274774 A1 | 12/2005 | Smith et al. |
| 2005/0277349 A1 | 12/2005 | Smith et al. |
| 2005/0277350 A1 | 12/2005 | Smith et al. |
| 2005/0277351 A1 | 12/2005 | Smith et al. |
| 2005/0277721 A1 | 12/2005 | Smith et al. |
| 2006/0034787 A1 | 2/2006 | Bujard |
| 2006/0142471 A1 | 6/2006 | Shindo |
| 2006/0231201 A1 | 10/2006 | Smith et al. |
| 2006/0234027 A1 | 10/2006 | Huusken |
| 2006/0234576 A1 | 10/2006 | Smith et al. |
| 2006/0258791 A1 | 11/2006 | Okamoto et al. |
| 2006/0280873 A1 | 12/2006 | Smith et al. |
| 2006/0281380 A1 | 12/2006 | Smith et al. |
| 2006/0281833 A1 | 12/2006 | Smith et al. |
| 2007/0026221 A1 | 2/2007 | Stevens et al. |
| 2007/0114704 A1 | 5/2007 | Stevens et al. |
| 2007/0141324 A1 | 6/2007 | Stevens et al. |
| 2008/0050580 A1 | 2/2008 | Stevens et al. |
| 2008/0066942 A1 | 3/2008 | Miller |
| 2008/0262128 A1 | 10/2008 | Stevens et al. |

FOREIGN PATENT DOCUMENTS

| | | |
|---|---|---|
| EP | 0 266 602 A1 | 5/1988 |
| EP | 0 394 767 A2 | 10/1990 |
| EP | 0 604 804 A2 | 7/1994 |
| EP | 1 220 240 A1 | 7/2002 |
| EP | 1 300 439 A1 | 4/2003 |
| EP | 1 383 266 A1 | 1/2004 |
| EP | 1 384 567 A1 | 1/2004 |
| EP | 1 486 997 A1 | 12/2004 |
| EP | 1 530 223 A1 | 5/2005 |
| GB | 881036 A2 | 11/1961 |
| JP | 56029305 | 3/1981 |
| JP | 03205443 A | 9/1991 |
| JP | 06313267 A | 11/1994 |
| JP | 10-088201 | 4/1998 |
| JP | 10-211659 | 8/1998 |
| JP | 2002212422 A | 7/2002 |
| JP | 200506389 A | 1/2005 |
| JP | 2005-199562 A | 7/2005 |
| WO | WO 95/02504 A1 | 1/1995 |
| WO | WO 96/28073 A1 | 9/1996 |
| WO | WO 98/41993 A1 | 9/1998 |
| WO | WO 99/26286 A1 | 5/1999 |
| WO | WO 00/56127 A1 | 9/2000 |
| WO | WO 01/68749 A1 | 9/2001 |
| WO | WO 01/84659 A1 | 11/2001 |
| WO | WO 03/040445 A1 | 5/2003 |
| WO | WO 2004/006271 A1 | 1/2004 |
| WO | WO 2004/052999 A2 | 6/2004 |
| WO | WO 2004/067606 A1 | 8/2004 |
| WO | WO 2005/069312 A1 | 7/2005 |
| WO | WO 2005/106089 A2 | 11/2005 |
| WO | WO 2005/123825 A2 | 12/2005 |
| WO | WO 2005/124790 A2 | 12/2005 |
| WO | WO 2006/002014 A1 | 1/2006 |
| WO | WO 2006/007385 A1 | 1/2006 |

OTHER PUBLICATIONS

Tari et al., "Impacts on Turbine Generator Design by the Application of Increased Thermal Conducting Stator Insulation" Cigre SC11-01 Meeting, Paper No. 132 (2002).

Sun et al., "Fundamental Research on Surface Modification of Nano-sized Silica for Underfill Applications" 2004 Electronic Components and Technology Conference (2004).

Brutsch et al., "New High Voltage Insulation with Increased Thermal Conductivity" Electrical Electronics Insulation Conference 1993 Proceedings, (Oct. 1993).

Tari et al., "A High Voltage System with Increased Thermal Conductivity for Turbo Generators" Coil Winding, Insulation and Electrical Manufacturing Conference (2001).

Tomoyuki Matsumura "Phase Structures and Thermal and Conductive Properties of Epoxy-Alumina Hybrids Filled with Conductive Fillers," STN Database No. 2002:257918, Apr. 8, 2002, Abstract pp. 1-2; XP-002356007.

Yasufumi Shibata, "Lipophillic Inorganic-Organic Fillers with Low Frictional Coefficient," STN Database No. 2002:568167, Jul. 31, 2002, Abstract pp. 1-3; XP-002355912.

Derwent Acc-No. 1980-39239C (JP 55053802 A Derwent Abstract) (Nippon Mica Seisaku).

Product Data Sheet for Polar Therm Boron Nitride Powder Grades PT120, PT140, PT160, and PT 180, provided by Momentive Performance Materials (2007).

* cited by examiner

COMPRESSION OF RESIN IMPREGNATED INSULATING TAPES

CROSS-REFERENCE TO RELATED APPLICATIONS

This application claims priority to U.S. provisional 60/580,023, filed Jun. 15, 2004, by Smith, et al., which is incorporated herein by reference.

FIELD OF THE INVENTION

The field of the invention relates to resin impregnated electrical insulation tapes.

BACKGROUND OF THE INVENTION

With the use of any form of electrical appliance, there is a need to electrically insulate conductors. With the push to continuously reduce the size and to streamline all electrical and electronic systems there is a corresponding need to find better and more compact insulators and insulation systems.

Various epoxy resin materials have been used extensively in electrical insulation systems due to their practical benefit of being tough and flexible electrical insulation materials that can be easily adhered to surfaces. Traditional electrical insulation materials, such as mica flake and glass fiber, can be surface coated and bonded with these epoxy resins, to produce composite materials with increased mechanical strength, chemical resistance and electrical insulating properties. In many cases epoxy resins have replaced traditional varnishes despite such materials having continued use in some high voltage electrical equipment.

Good electrical insulators, by their very nature, also tend to be good thermal insulators, which is undesirable. Thermal insulating behavior, particularly for air-cooled electrical equipment and components, reduces the efficiency and durability of the components as well as the equipment as a whole. It is desirable to produce electrical insulation systems having maximum electrical insulation and minimal thermal insulation characteristics.

Electrical insulation often appears in the form of tapes, which themselves have various layers. Common to these types of tapes is a paper layer that is bonded at an interface to a fiber layer, both layers tending to be impregnated with a resin. A favored type of insulation material is a mica-tape. Improvements to mica tapes include catalyzed mica tapes as taught in U.S. Pat. No. 6,103,882. The mica-tape may be wound around conductors to provide extremely good electrical insulation. An example of this is shown in FIG. 1. Illustrated here is a coil 13, comprising a plurality of turns of conductors 14, which in the example illustrated here are assembled into a bakelized coil. The turn insulation 15 is prepared from a fibrous material or material, for example glass or glass and Dacron which is heat treated. Ground insulation for the coil is provided by wrapping one or more layers of composite mica tape 16 about the bakalized coil 14. Such composite tape may be a paper or felt of small mica flakes combined with a pliable backing sheet 18 of, for example, glass fiber cloth or polyethylene glycol terephthalate mat, the layer of mica 20 being bonded thereto by a liquid resinous binder. Generally, a plurality of layers of the composite tape 16 are wrapped about the coil depending upon voltage requirements. A wrapping of an outer tape 21 of a tough fibrous material, for example, glass fiber, may be applied to the coil.

Generally, multiple layers of the mica tape 16 are wrapped about the coil with sixteen or more layers generally being used for high voltage coils. Resins are then impregnated into the tape layers. Unfortunately this amount of insulation only further adds to the complications of dissipating heat. What is needed is electrical insulation that can conduct heat higher than that of conventional methods, but that does not compromise the electrical insulation and other performance factors including.

Other difficulties with the prior art also exist, some of which will be apparent upon further reading.

SUMMARY OF THE INVENTION

With the foregoing in mind, methods and apparatuses consistent with the present invention, which inter alia facilitates the dispersion of phonons through a high thermal conductivity (HTC) impregnated medium by the compression of the medium to reduce the mean distances between the HTC materials below that of the mean phonon path length. This reduces the phonon scattering and produces a greater net flow of phonons away from the heat source. When the resins are impregnated into a host matrix medium, such as a multi-layered insulating tape, and then this is compressed, a higher percentage of the HTC materials will remain within the impregnated matrix. Alternately, the HTC materials may be loaded onto the tape and then impregnated with resin and then compressed, or the tape may even be compressed prior to the resin impregnation. In such cases, the tapes may even be compressed both before and after the impregnation with resin.

These and other objects, features, and advantages in accordance with the present invention are provided particular embodiments providing for a method of impregnating a matrix with a high thermal conductivity filled resin that comprises impregnating the matrix with a high thermal conductivity material loaded resin, which produces a resin impregnated matrix. The high thermal conductivity material comprises 5-60% by volume of the resin. This is compressed by approximately 5-30%, and the distances between the high thermal conductivity materials loaded in the resin are reduced. The resin is then cured. The high thermal conductivity materials comprise at least one of silica, alumina, magnesium oxide, silicon carbide, boron nitride, aluminum nitride, zinc oxide and diamonds and dendrimers of approximately 1-1000 nm in size, and the high thermal conductivity materials have aspect ratios of 10-50.

In another embodiment the present invention provides for a method of impregnating an insulating tape used with an electrically conducting object with a filled resin that comprises impregnating the tape with a high thermal conductivity material loaded resin. Then compressing the tape impregnated with the resin and curing the resin. The high thermal conductivity materials comprises at least one of silica, alumina, magnesium oxide, silicon carbide, boron nitride, aluminum nitride, zinc oxide and diamonds and dendrimers of approximately 1-1000 nm in size, and the high thermal conductivity material comprises 5-60% by volume of the resin. Phonons passing through the resin have a mean phonon path length, where compressing the tape impregnated with the resin reduced the spacing between the high thermal conductivity material within the resin to an average distance below that of the mean phonon path length. The mean phonon path length can vary, but is generally 2-100 nm.

In still another embodiment the present invention provides for a method of adding high thermal conductivity materials to an insulating medium that comprises adding high thermal conductivity materials that comprise at least one of silica, alumina, magnesium oxide, silicon carbide, boron nitride, aluminum nitride, zinc oxide and diamonds and dendrimers of approximately 1-1000 nm in size, to the insulating medium. The insulating medium is then impregnated with a resin and compressed approximately 5-30% of its total volume or width. This is then cured. Phonons passing through the insulating medium have a mean phonon path length and the insulating medium reduces the spacing between the high thermal conductivity material within the insulating medium to an average distance below that of the mean phonon path length. Alternately, the insulating medium can be compressed prior to the insertion of the resin. In still another embodiment, the insulating medium can be compressed both prior and after the resin impregnation.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

The present invention provides for resin impregnated insulation objects, such as tapes, that are compressed to reduce the mean length scales (distance) between loaded high thermal conductivity (HTC) fillers below that of the mean phonon path length. The thermal conductivity of resins of the prior art limits the efficiency of the electrical system to which the resin impregnated tapes are applied. To improve the thermal conductivity of the resin matrix, HTC materials are loaded into the resin, which is then impregnated into the insulation tape, or loaded into the insulating tape which is then impregnated with resin.

The tapes may be impregnated with resin before or after being applied to electrical objects. Resin impregnation techniques include VPI and GVPI, discussed more below. In VPI, once a tape is lapped and impregnated it is compressed according to the present invention. In GVPI the tape layers are compressed according the present invention and then wound into a slot and subsequently impregnated. The compression is mechanical and may be accomplished by a variety of techniques, such as presses, vices, clamps and other devices and techniques such as hydrostatic compression. During the compression stage the taped object may be transferred to a final location.

Once in position, the resin in the compressed tape is cured, which effectively locks the position of the HTC materials. In some embodiments the resin is cured in a two stage process, as will be apparent to one of ordinary skill in the art. However, optimal compression of the loaded HTC materials favors a completely uncured resin during the compression stage. Additionally, the present invention may utilize multiple, discrete compression stages. These multiple compression stages may be performed one after another, or may be separated by other stages, such as relaxation, additional lapping, semi-curing and/or transport.

Figure 1:
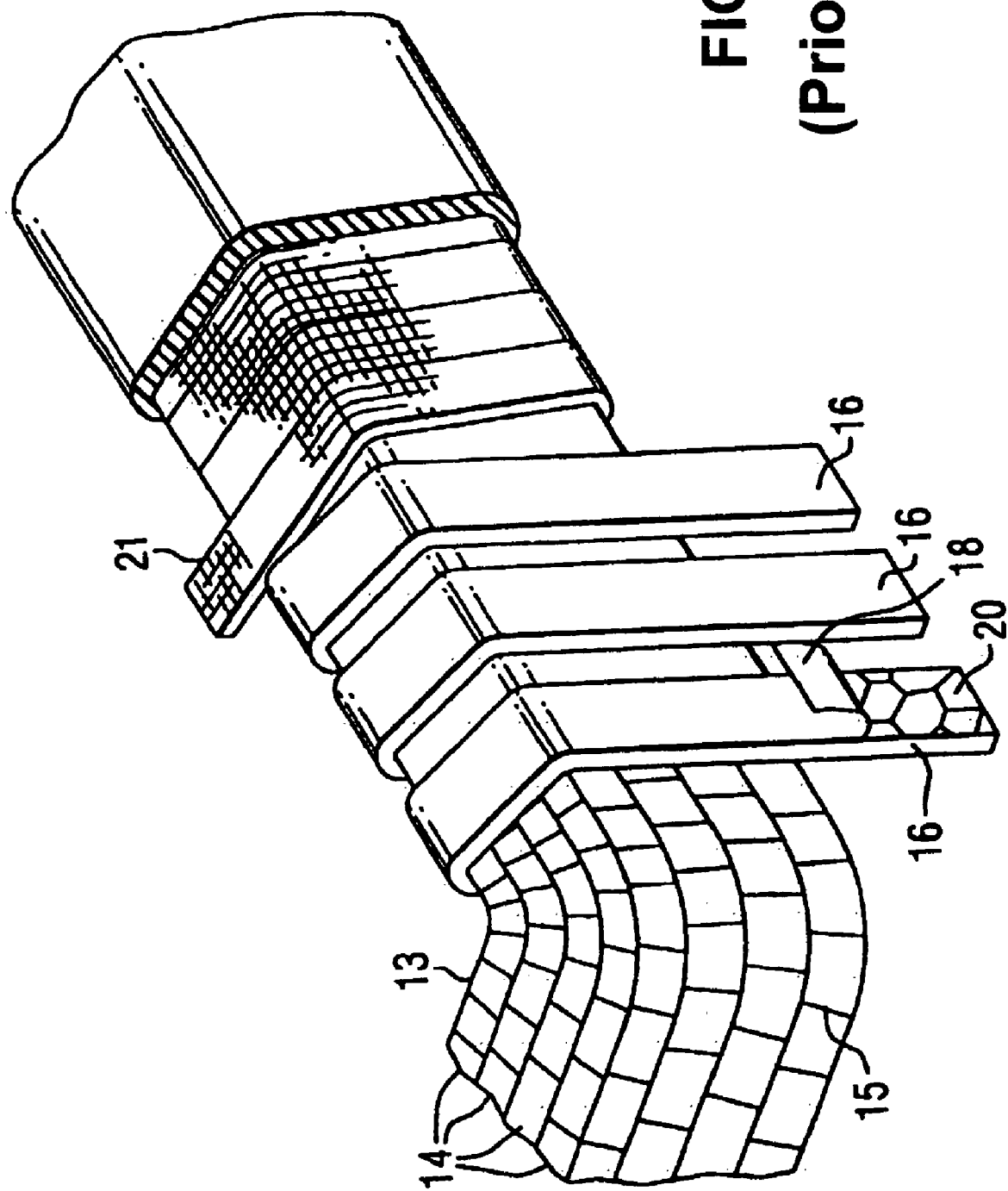
FIG. 1 shows the use of an insulating tape being lapped around a stator coil.
Figure 2:
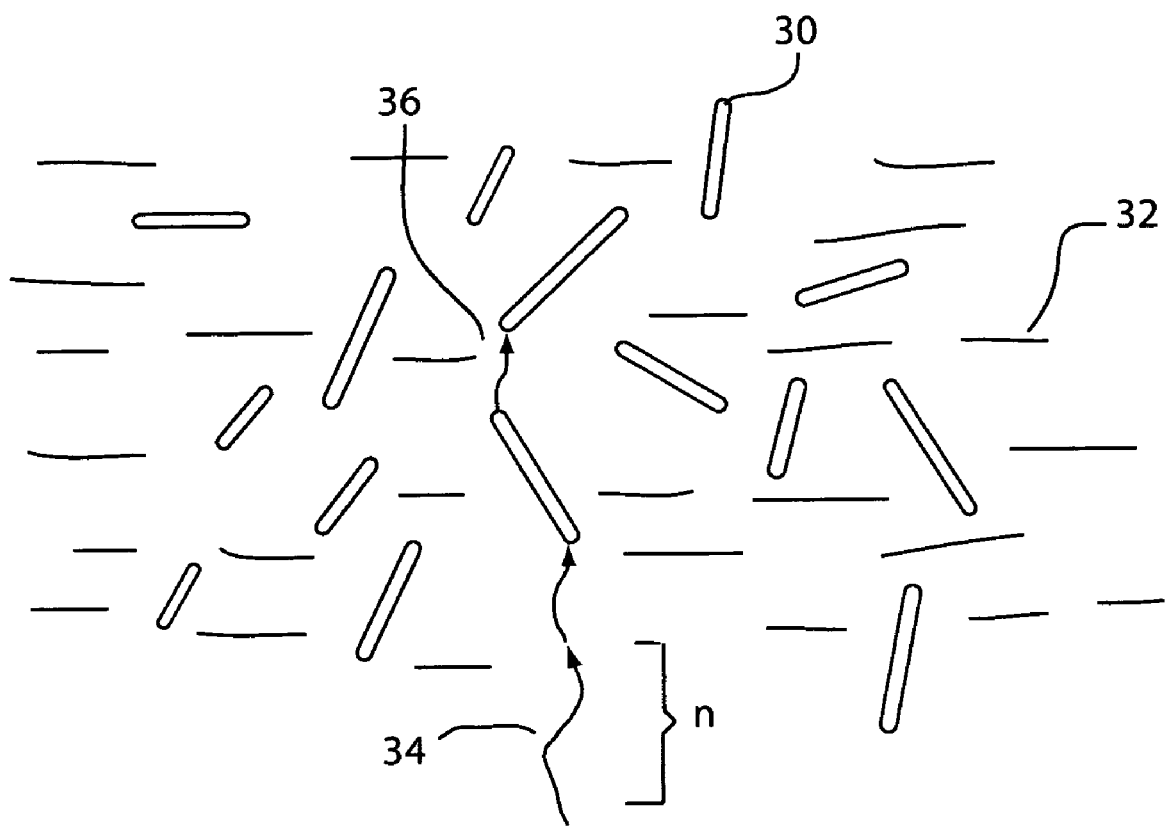
FIG. 2 illustrates phonons traveling through a loaded resin of the present invention.

FIG. 2 shows one embodiment of the present invention. Illustrated here are HTC materials 30 loaded into a resinous matrix 32. Phonons 34 traveling through the matrix have a mean path length n. This path length can vary depending on the exact composition of the resin matrix, but is generally from 2 to 100 nm, and more typically 5-50 nm,0020for resins such as epoxy resins. Therefore the mean distance between the loaded HTC materials should be on average less than this distance. Note that the distance between the HTC materials can vary in the thickness versus transverse direction of the tape, and it is generally the thickness direction where the spacing needs to be optimized.

As phonons 34 travel through the resin 32 they will tend to pass along the embedded HTC materials 30. This will increase the local phonon flux since the raw HTC materials will have a thermal conductivity of between 10-1000 W/mK, as opposed to the resin which is about 0.1-0.5 W/mK. As phonons pass along a loaded HTC material the phonons 36 pass to the next HTC material if the distance between the materials is less than n, therefore the HTC materials form an interconnecting network. FIG. 2 illustrates an idealized path. In practice there will be phonon scattering as the phonons pass between the resin and HTC materials, although the shorter the distance between the materials the less the scattering.

The amount of HTC materials loaded in the resin could actually be quite low, for example about 10% as illustrated in FIG. 2. The average distances, or length scales, between loaded HTC materials therefore may be slightly greater than n, however, a large percentage will still be less than n and therefore fall within embodiments of the present invention. In particular embodiment, the percentage materials that are less than n distance from the next HTC material is over 50%, with particular embodiment being over 75%. In particular embodiment the average length of the HTC materials is greater than n, which further aids in phonon transport.

The shorter n the greater the concentration of loaded HTC materials, and conversely, the greater the particle size, the less HTC materials needed. Particular embodiment use 5-60% loaded HTC materials by total volume of the resins and fillers, with more particular embodiments at 25-40%. When the resin is impregnated into the tape, it will fill up the spaces between the tape fibers and substrates. The HTC distribution within the tape at this point, however, is often not optimized, and can even have the mean distance between HTC materials greater than n. Practice of the present invention then compresses the resin impregnated tapes and reduces the distances between the loaded HTC materials.

When a loaded resin is being impregnated into a tape, the fibers or particles of the tape act to block some of the HTC materials, particularly if the resin is 30% or more filler. However, by compressing the tapes, the reverse happens, and more fillers are trapped within the tape as the HTC materials attach themselves to non-mobile parts of the overall structure. The HTC fillers even get pinned to one another. In the embodiments given, it has been implied that the fillers do not react with the resin matrix, however, in some embodiments the fillers do form covalent bonds with the resin and form more homogeneous matrixes. In a homogenous matrix, the resins that are bound to fillers will be retained better than the unbound resins during compression.

The amount of compression of the tape is generally about 5-30% of total size of the resin impregnated tape. Other fields that may use the present invention, such as impregnated circuit boards will have similar total compression. Since phonons scatter as they pass between interfaces, such as between the HTC materials and the resin matrix, the shorter the distance between the materials the less the scattering.

Therefore greater compression will provide better results as long as the overall integrity of the tape or other impregnated structure is maintained.

As discussed, in some situations, objects lapped with tape, either impregnated or to be impregnated, are transferred during the compression stage. During these and other embodiments the tapes can be overly compressed and then allowed to relax slightly back to a less compressed state. The amount of relaxing is slight, for example 5-50% of the original compression. This allows for proper insertion of a lapped object into a tight spot, such as a slot, without damaging the tape and while maintaining the proper distribution of loaded HTC materials.

The sooner the resin is cured, the less relaxation of the compression there will be. This is particularly so if the resin is cured while the resin, and host medium, is being compressed. The amount of relaxation in particular embodiments is kept to 5% or less of the total compression. In embodiments where additional relaxation is desired, the compression can be reduced before the resin is fully cured.

As used herein, the term resin refers to all resins and epoxy resins, including modified epoxies, polyesters, polyurethanes, polyimides, polyesterimides, polyetherimides, bismaleimides, silicones, polysiloxanes, polybutadienes, cyanate esters, hydrocarbons etc. as well as homogeneous blends of these resins. This definition of resins includes additives such as cross-linking agents, accelerators and other catalysts and processing aids. Certain resins, such as liquid crystal thermosets (LCT) and 1,2 vinyl polybutadiene combine low molecular weights characteristics with good crosslinking properties.

The HTC materials loaded into the resins are of a variety of substances that can be added so that they may physically and/or chemically interact with or react with the resins to improve thermal conductivity. In one embodiment, the HTC materials are dendrimers, and in another embodiment they are nano or micro inorganic fillers having a defined size or shape including high aspect ratio particles with aspect ratios (ratio mean lateral dimension to mean longitudinal dimension) of 3 to 100 or more, with a more particular range of 10-50.

In a related embodiment, the HTC materials may have a defined size and shape distribution. In both cases the concentration and relative concentration of the filler particles is chosen to enable a bulk connecting (or so-called percolation) structure to be achieved which confers high thermal conductivity with and without volume filling to achieve a structurally stable discrete two phase composite with enhanced thermal conductivity. In another related embodiment, the orientation of the HTC materials increases thermal conductivity. In still another embodiment, the surface coating of the HTC materials enhances phonon transport. These embodiments may stand apart from other embodiments, or be integrally related. For example, dendrimers are combined with other types of highly structured materials such as thermoset and thermoplastic materials. They are uniformly distributed through a resin matrix such that the HTC materials reduce phonon scattering and provide micro-scale bridges for phonons to produce good thermally conducting interfaces between the HTC materials. The highly structured materials are aligned so that thermal conductivity is increased along a single direction or directions to produce either localized or bulk anisotropic electrically insulating materials. In another embodiment HTC is achieved by surface coating of lower thermal conductivity fillers with metal oxides, carbides or nitrides and mixed systems having high thermal conductivity which are physically or chemically attached to fillers having defined bulk properties, such attachment being achieved by processes such as chemical vapour deposition and physical vapour deposition and also by plasma treatment.

In related embodiments, the HTC materials form essentially homogenous mixtures with the resins, essentially free of undesired microscopic interfaces, variable particle wetting and micro void formation. These homogeneous materials form a continuous-phase material which are non-discrete at length scales shorter than either the phonon wavelength or phonon mean free path in conventional electrical insulating materials. In some embodiments, intentional interfaces can be placed in the resin structure so as to control dielectric breakdown. In insulating materials, dielectric breakdown will occur given the right conditions. By controlling the nature and spatial distribution of the interfaces in two-phase system, dielectric breakdown strength and long term electrical endurance can be enhanced. Increases in dielectric strength will take place in part because of increased densification, the removal of micro voids and a higher level of internal mechanical compression strength.

In all cases phonon transport is enhanced and phonon scattering reduced by ensuring the length scales of the structural elements are shorter than or commensurate with the phonon distribution responsible for thermal transport. Larger HTC particulate materials can actually increase phonon transport in their own right, however, smaller HTC materials can alter the nature of the resin matrix, thereby affect a change on the phonon scattering. This may be further assisted by using nano-particles whose matrices are known to exhibit high thermal conductivity and to ensure that the particle size is sufficient to sustain this effect and also to satisfy the length scale requirements for reduced phonon scattering.

Continuous two-phase organic-inorganic hybrids may be formed by incorporating inorganic nano-particles in linear or crosslinked polymers and thermosetting resins in which nano-particles dimensions are of the order of or less than the polymer or network segmental length (typically 1 to 50 nm). This would include, but is not exclusive to three routes or mechanisms by which this can occur (i) side chain grafting, (ii) inclusive grafting e.g. between two polymer chain ends, (iii) cross linking grafting involving several polymer molecules. These inorganic nano-particles will contain reactive surfaces to form intimate covalently bonded hybrid organic-inorganic homogeneous materials. These nano-particles may be alumina, magnesium oxide and zinc oxide and other metal oxides, boron nitride and aluminum nitride and other metal nitrides, silicon carbide and other carbides, diamond of natural or synthetic origin, and any of the various physical forms of each type and other metal carbides and hybrid stoichiometric and non-stoichiometric mixed oxides, nitrides and carbides. Further, these nano-particles will be surface treated to introduce a variety of surface functional groups which are capable of participating in reactions with the host organic polymer or network. The volume percentage of the HTC materials in the resin may be up to approximately 60% or more by volume, and more particularly up to approximately 35% by volume. Higher volume filling tends to give higher structural stability to a matrix. However, with control of the size and shape distribution, degree of particle association and alignment the HTC materials can occupy as little as 1% by volume or less. Although, for structural stability reasons, it might be useful to add an amount greater than the minimum needed for percolation to occur. Therefore the resin can withstand physical strains and deformation without damaging the percolation structure and the HTC characteristics.

In many embodiments, the size and shape of the HTC-materials are varied within the same use. Ranges of size and shape are used in the same product. A variety of long and shorter variable aspect ratio HTC-materials will enhance the thermal conductivity of a resin matrix, as well as potentially provide enhanced physical properties and performance. One aspect that should be observed, however, is that the particle length does not get so long as to cause bridging between layers of substrate/insulation. Also, a variety of shapes and length will improve the percolation stability of the HTC-materials by providing a more uniform volume filing and packing density, resulting in a more homogeneous matrix. When mixing size and shapes, in one embodiment the longer particles are more rod-shaped, while the smaller particles are more spheroidal, platelet or discoid and even cuboids. For example a resin containing HTC-materials could contain about 55-65% by volume 10-50 nm diameter spheroids and about 15-25% by volume 10-50 µm length rods, with 10-30% volume resin.

In regards to shape, the present invention utilizes shapes tending towards natural rods and platelets for enhanced percolation, with rods being the most preferred embodiment including synthetically processed materials in addition to those naturally formed. A rod is defined as a particle with a mean aspect ratio of approximately 5 or greater, with particular embodiments of 10 or greater, though with more particular embodiments of no greater than 100. In one embodiment, the axial length of the rods is approximately in the range 10 nm to 100 microns. Smaller rods will percolate a resin matrix better, and have less adverse effect on the viscosity of the resin.

Many micro particles form spheroidal and discoid shapes, which have reduced ability to distribute evenly under certain conditions and so may lead to aggregated filamentary structures that reduce the concentration at which percolation occurs. By increasing the percolation, the thermal properties of the epoxy resin can be increased, or alternately, the amount of HTC material that needs to be added to the epoxy resin can be reduced. Also, the enhanced percolation results in a more even distribution of the HTC materials within the epoxy resin rather than agglomeration which is to be avoided, creating a more homogenous product that is less likely to have undesired interfaces, incomplete particle wetting and micro-void formation. Likewise aggregated filamentary or dendritic structures, rather than globular (dense) aggregates or agglomerates, formed from higher aspect ratio particles confer enhanced thermal conductivity.

Reactive surface functional groups may be formed from surface groups intrinsic to the inorganic coating or may be achieved by applying additional organic coatings both of which may include hydroxyl, carboxylic, amine, epoxide, silane, vinyl and other groups which will be available for chemical reaction with the host organic matrix. These single or multiple surface coatings and the surface functional groups may be applied using wet chemical methods, non-equilibrium plasma methods including plasma polymerization and chemical vapour and physical vapour deposition, sputter ion plating and electron and ion beam evaporation methods.

As used in reference to HTC materials being applied to paper, the term substrate refers to the host material that the insulating paper is formed from, while matrix refers to the more complete paper component made out of the substrate. These two terms may be used somewhat interchangeable when discussing this embodiment of the present invention. The increase of thermal conductivity should be accomplished without significantly impairing the electrical properties, such as dissipation factor, or the physical properties of the substrate, such as tensile strength and cohesive properties. The physical properties can even be improved in some embodiments, such as with surface coatings. In addition, in some embodiments the electrical resistivity of the host matrix can also be enhanced by the addition of HTC materials.

The HTC materials can be added to the substrate or matrix at one or more of the various stages of manufacture of the insulating paper. Distinct stages in the manufacture of an insulating paper exist. For the purpose of the present invention, these can be separated into three stages. The raw material stage, the slurry stage, and the paper product stage. For example, a mica paper begins as mica which is converted to flakes then to mica flakelets that are then combined with a liquid into a slurry, which is then run through a machine to produce a mica paper.

In addition to the standard mica (Muscovite, Phlogopite) that is typically used for electrical insulation there is also Biotite mica as well as several other Mica-like Alumino-Silicate materials such as Kaolinite, Halloysite, Montmorillonite and Chlorite. Montmorillonite has lattices in its structure which can be readily intercalated with HTC materials such as metal cations, organic compounds and monomers and polymers to give high dielectric strength composites.

The addition of HTC materials can occur at any or all of the production stages. Each of these stages, of course, will comprise of multiple sub-stages at which the HTC material may be added. The process of applying the HTC materials at the various stages will have to account for the difference in physical characteristics of the host matrix at these various stages. For example, adding the HTC materials to loose mica flakes or mica flakelets is different than adding the materials to the mica in the slurry or the paper product. HTC materials may also be present in other component parts of the finished insulating tape, such as the backing fabric, or the interlayer bonding resins.

The process of manufacture of insulating paper combines thermal, chemical, and mechanical treatments individually or in combinations, to produce a pulp that is then transformed into sheets that make up the paper. HTC-materials can be added to the raw material stage either in the dry form or contained in a liquid or other medium. The HTC material is added to the substrate, such as dry mica flakelets, and intermixed to form, in one instance, a homogeneous distribution within the substrate. Methods such as heat may be used to remove the liquid medium that delivers the HTC materials to the substrate.

HTC materials are incorporated into the matrix at the slurry stage by adding them to a suspension in an agglomerated or non-agglomerated form in a liquid-carrier. Aggregation of the HTC material is generally not preferred at this stage but in some cases it may be used depending on the nature of the aggregate structure. Surfactants, chemical surface preparation, or pH control may be used to ensure the particles do not aggregate or that they aggregate in particular ways. If the HTC are to some degree self aligning or can be aligned by external forces then full dispersion on mixing may not be necessary.

In the slurry stage the fillers may either be added as a powder or as a suspension in a liquid phase. The liquid can be of a variety of types used in the art, though water is typical. The water itself can be deionized, demineralized, or have additives to control its pH value.

To add the HTC materials into the paper product the fillers may be incorporated into a suitable solvent as a suspension. Examples are typical organic solvents such as hexane, toluene, methylethylketone etc. Similarly, it is desired that the HTC material be uniformly distributed in the liquid as a non-aggregated suspension. The size distribution of the particles may be chosen to fulfill the desired objective in relation to the void size distribution in host matrix. The HTC material size and shape distribution may be employed to influence the thermal conductivity and other physical properties, and use can be made of the different close packing behavior of such components or of their different aggregation or self-assembling behavior, to achieve this.

At the slurry or paper product stage, the solvents may also contain one or more accelerators, such a zinc naphthenate and other metal-salts or organometallics, which may be used to accelerate the reaction of a later impregnated resin. HTC material can be added together with the accelerator in a common solvent or accelerator.

In this embodiment present invention inserts HTC materials into a host matrix, or substrate, such as a mica and polyester. Other substrate components include glass flakes, and Kapton™, which is a polyimide, or Mylar™ which is a polyester such as polyethylene terephthalate. The HTC materials can be applied to any and all external and internal surfaces. Although flakes are a common first stage substrate, some types of substrate materials may use different physical formations, or even combinations of physical formations that can form composite paper that can be multi-layered or continuous.

Note that while the present invention has articulated using HTC materials either as a filler in an impregnating resin, or as an integral part of the insulating paper that is later impregnated with resin, both may be used in conjunction with one another. By combining the embodiments, the dispersion of HTC materials in the final product can be increased. When the HTC material are present in the matrix, the host material can be compressed both prior to and/or after resin impregnation.

Types of resin impregnation used with stator coils are known as VPI and GVPI. Tape is wrapped around the coil and then impregnated with low viscosity liquid insulation resin by vacuum-pressure impregnation (VPI). That process consists of evacuating a chamber containing the coil in order to remove air and moisture trapped in the mica tape, then introducing the insulation resin under pressure to impregnate the mica tape completely with resin thus eliminating voids, producing resinous insulation in a mica matrix. A compression of about 20% is particular to the VPI process in some embodiments. After this is completed, the coils are heated to cure the resin. The resin may contain an accelerator or the tape may have one in it. A variation of this, global VPI (GVPI) involves the process where dry insulated coils are wound, and the then whole stator is vacuum pressure impregnated rather than the individual coils. In the GVPI process, the coils are compressed prior to impregnation with the resin since the dry coils are inserted into their final position prior to impregnation. Although various compression methods have been discussed above, it is also possible to use the VPI/GVPI impregnating process for the actual compression stage of the present invention.

In one embodiment the present invention provides for a method of impregnating a matrix with a high thermal conductivity filled resin that comprises impregnating the matrix with a high thermal conductivity material loaded resin, which produces a resin impregnated matrix. The high thermal conductivity material comprises 5-60% by volume of the resin. This is compressed by approximately 5-30%, and the distances between the high thermal conductivity materials loaded in the resin are reduced. The resin is then cured. The high thermal conductivity materials comprise at least one of silica, alumina, magnesium oxide, silicon carbide, boron nitride, aluminum nitride, zinc oxide and diamonds and dendrimers of approximately 1-1000 nm in size, and the high thermal conductivity materials have aspect ratios of 10-50.

In particular embodiments the distances between the high thermal conductivity materials loaded in the resin are approximately 5-50 nm. In some embodiments the resin impregnated matrix is compressed at least twice before curing.

In another embodiment the present invention provides for a method of impregnating an insulating tape used with an electrically conducting object with a filled resin that comprises impregnating the tape with a high thermal conductivity material loaded resin. Then compressing the tape impregnated with the resin and curing the resin. The high thermal conductivity materials comprises at least one of silica, alumina, magnesium oxide, silicon carbide, boron nitride, aluminum nitride, zinc oxide and diamonds and dendrimers of approximately 1-1000 nm in size, and the high thermal conductivity material comprises 5-60% by volume of the resin. Phonons passing through the resin have a mean phonon path length, where compressing the tape impregnated with the resin reduced the spacing between the high thermal conductivity material within the resin to an average distance below that of the mean phonon path length. The mean phonon path length can vary, but is generally 2-100 nm.

In particular embodiments the tape is impregnated with the resin prior to being lapped about the electrically conducting object. In other embodiments the tape is impregnated with the resin after to being lapped about the electrically conducting object. Impregnation is performed, for example, by VPI and GVPI. Depending on the application, additional high thermal conductivity materials are added to the tape prior to the resin being impregnated.

In other particular embodiments, the high thermal conductivity material comprises 25-40% by volume of the resin and the high thermal conductivity materials have an aspect ration of 3-100. In other particular embodiments the high thermal conductivity materials are from 10 nm to 100 microns in length.

In still another embodiment the present invention provides for a method of adding high thermal conductivity materials to an insulating medium that comprises adding high thermal conductivity materials that comprise at least one of silica, alumina, magnesium oxide, silicon carbide, boron nitride, aluminum nitride, zinc oxide and diamonds and dendrimers of approximately 1-1000 nm in size, to the insulating medium. The insulating medium is then impregnated with a resin and compressed approximately 5-30% of its total volume or width. This is then cured. Phonons passing through the insulating medium have a mean phonon path length and the insulating medium reduces the spacing between the high thermal conductivity material within the insulating medium to an average distance below that of the mean phonon path length.

In a particular embodiment, the resin is also filled with high thermal conductivity materials similar to those added to the insulating medium. The insulating medium may be tape, in which is also referred to as the host substrate or host matrix.

In a further particular embodiment the insulating medium is additionally compressed after the thermal conductivity materials are added and before the resin is impregnated. The total amount of compression for the two compressions is approximately 10-30%.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A method of impregnating a matrix comprising:
impregnating said matrix with a high thermal conductivity material loaded resin, wherein high thermal conductivity materials of said resin comprise 5-60% by volume of said resin, to produce a resin impregnated matrix;
after said impregnating, but prior to curing said resin impregnated matrix compressing said resin impregnated matrix by approximately 5-30%, wherein said compressing is effective to provide a network of said high thermal conductivity materials having reduced distances between said high thermal conductivity materials loaded in said resin; and
curing said resin impregnated matrix to effectively lock a position of said network of said high thermal conductivity materials in place;
wherein said high thermal conductivity materials comprise at least one of silica, alumina, magnesium oxide, silicon carbide, boron nitride, aluminum nitride, zinc oxide and diamonds and dendrimers of approximately 1-1000 nm in size, and wherein said high thermal conductivity materials have aspect ratios of 10-50.

2. The method of claim 1, wherein the distances between said high thermal conductivity materials loaded in said resin are approximately 5-50 nm.

3. The method of claim 1, wherein said resin impregnated matrix is compressed in a first compression, and thereafter is allowed to relax to 5-50% of the first compression.

4. A method of impregnating an insulating tape used with an electrically conducting object with a high thermal conductivity material loaded resin comprising:
impregnating said tape with the high thermal conductivity material loaded resin, wherein phonons passing through said resin have a mean phonon path length;
after said impregnating, but prior to curing said resin, compressing said tape impregnated with said resin, wherein said compressing comprises reducing the spacing between high thermal conductivity materials within said resin to an average distance below that of said mean phonon path length; and
curing said resin, wherein said curing is effective to lock a position of said high thermal conductivity materials with said reduced spacing in place;
wherein said high thermal conductivity materials comprise at least one of silica, alumina, magnesium oxide, silicon carbide, boron nitride, aluminum nitride, zinc oxide and diamonds and dendrimers of approximately 1-1000 nm in size; and
wherein said high thermal conductivity materials comprise 5-60% by volume of said resin.

5. The method of claim 4, wherein said tape is impregnated with said resin prior to being lapped about said electrically conducting object.

6. The method of claim 4, wherein said tape is impregnated with said resin after being lapped about said electrically conducting object.

7. The method of claim 6, wherein said impregnation is performed by at least one of vacuum-pressure impregnation (VPI) and global vacuum-pressure impregnation (GVPI).

8. The method of claim 4, wherein said high thermal conductivity material comprises 25-40% by volume of said resin.

9. The method of claim 4, wherein said mean phonon path length is 2-100 nm.

10. The method of claim 4, wherein said high thermal conductivity materials have an aspect ration of 3-100.

11. The method of claim 4, wherein said high thermal conductivity materials are from 10 nm to 100 microns in length.

12. The method of claim 4, wherein high thermal conductivity materials are added to said tape prior to said resin being impregnated.

13. A method of adding high thermal conductivity materials to an insulating medium comprising:
adding said high thermal conductivity materials that comprise at least one of silica, alumina, magnesium oxide, silicon carbide, boron nitride, aluminum nitride, zinc oxide and diamonds and dendrimers of approximately 1-1000 nm in size, to said insulating medium, wherein phonons passing through said insulating medium have a mean phonon oath length;
impregnating said insulating medium with a resin;
after said impregnating and prior to curing said resin, compressing said insulating medium approximately 5-30%, wherein said compressing said insulating medium reduces the spacing between said high thermal conductivity materials within said insulating medium to an average distance below that of said mean phonon path length; and
curing said resin, wherein said curing is effective to lock a position of said high thermal conductivity materials with said reduced spacing in place.

14. The method of claim 13, wherein said resin is further filled with high thermal conductivity materials.

15. The method of claim 13, wherein said insulating medium is additionally compressed after said thermal conductivity materials are added and before said resin is impregnated.

16. The method of claim 15, wherein the total amount of compression for the two compressions is approximately 10-30%.

17. The method of claim 13, wherein said insulating medium is a tape, wherein said impregnating is performed by at least one of vacuum-pressure impregnation (VPI) and global vacuum-pressure impregnation (GVPI).

18. The method of claim 13, wherein said high thermal conductivity materials have an aspect ration of 3-100.

19. The method of claim 13, wherein said high thermal conductivity materials are from 10 nm to 100 microns in length.

20. The method of claim 13, wherein said insulating medium is compressed prior to the impregnation of the resin.

* * * * *